United States Patent [19]

Kielinski

[11] Patent Number: 5,845,356
[45] Date of Patent: Dec. 8, 1998

[54] LOADING RAMP AND HANDLING APPARATUS

[75] Inventor: Thomas P. Kielinski, Plymouth Meeting, Pa.

[73] Assignee: Braj Enterprise Inc., Blue Bell, Pa.

[21] Appl. No.: 892,354

[22] Filed: Jul. 14, 1997

Related U.S. Application Data

[60] Provisional application No. 60/022,197 Jul. 19, 1996.
[51] Int. Cl.⁶ ................................................. E01D 1/100
[52] U.S. Cl. ................................................. 14/69.5
[58] Field of Search .................. 14/69.5, 71.1, 14/71.3, 72.5; 414/389, 402

[56] References Cited

U.S. PATENT DOCUMENTS

| | | | |
|---|---|---|---|
| 2,739,325 | 3/1956 | Grace, Jr. | 14/72 |
| 4,554,695 | 11/1985 | Rowland | 14/69.5 |
| 5,065,468 | 11/1991 | Sherrod | 14/72 |
| 5,306,112 | 4/1994 | Kielinski | 14/69.5 |

*Primary Examiner*—Tamara L. Graysay
*Assistant Examiner*—Rainna P. Strauss
*Attorney, Agent, or Firm*—Howson & Howson

[57] ABSTRACT

A combined loading ramp and handling apparatus use on a loading dock comprises a ramp with rollers mounted on its side edges and a pair of parallel rails mounted on the loading lock. The rails have convex plates over which the rollers ride to lift the front edge of the ramp as it passes into the cargo compartment of a truck or trailer. The rails are secured together by a frame, and safety gates are mounted on posts secured to the frame.

15 Claims, 3 Drawing Sheets

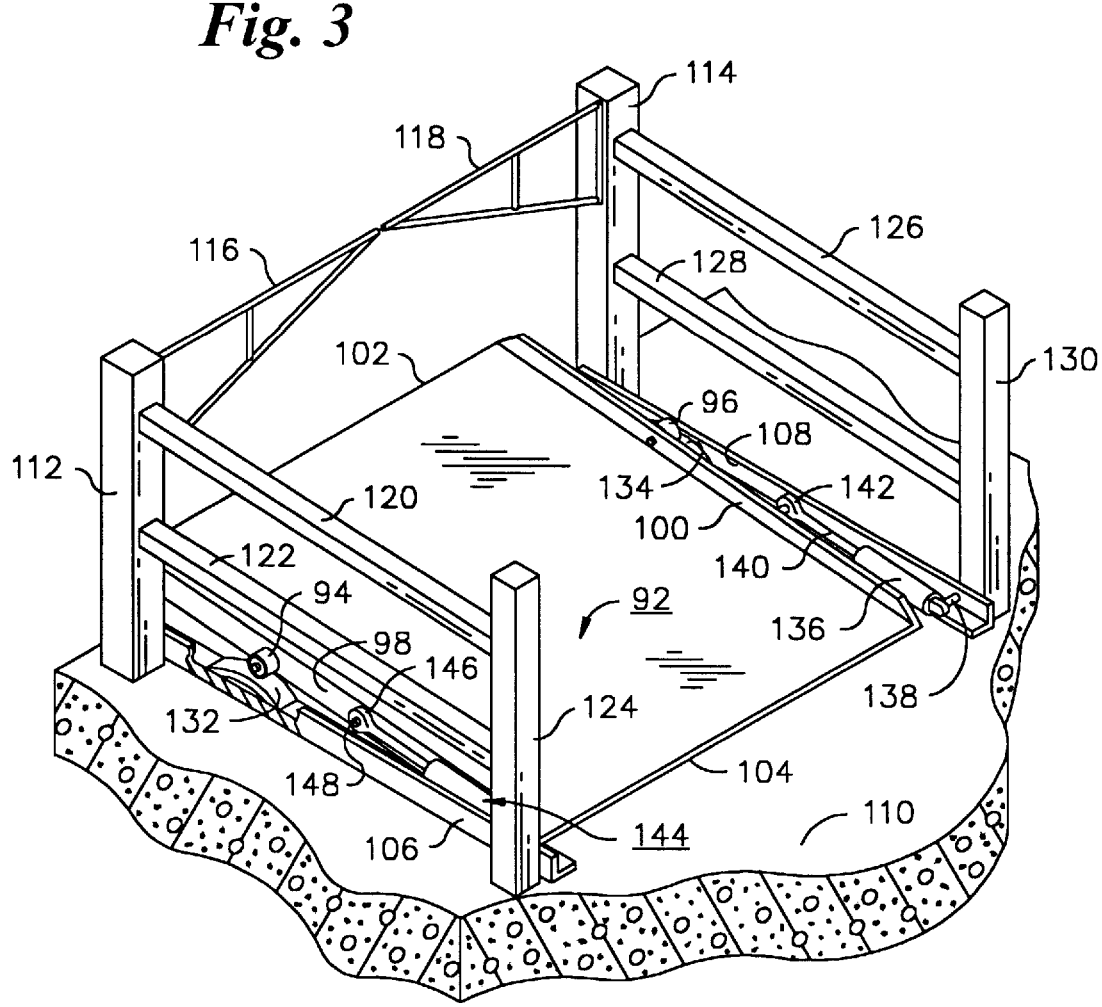

LOADING RAMP AND HANDLING APPARATUS

This is a provisional application Ser. No. 60/022,197 filed Jul. 19, 1996.

BRIEF SUMMARY OF THE INVENTION

This invention relates to loading ramps, and more particularly to a combined loading ramp and handling apparatus for facilitating the movement of the loading ramp into position so that it bridges that gap between the edge of a loading dock and the back of a truck or trailer parked at the loading dock, and accommodates differences in the heights of the dock and the cargo bed of the truck or trailer.

For the purpose of this specification, the term "loading ramp" should be understood as including not only the typical dock plate without curbs on its side edges, but also curbed loading ramps, sometimes known as "dock boards."

A typical loading ramp is formed of steel or aluminum and is within the range from 36 to 72 inches in width and from 24 to 72 inches in length. Its weight is typically in the range of 45 to 770 pounds. Various measures have been taken to avoid the difficulties encountered in handling the larger and heavier ramps. For example, some ramps are provided with handles to enable them to be lifted manually by two workers. In the case of heavier dock boards, lifting chains are often attached to the curbs of a dock board to enable the board to be moved by a fork lift. U.S. Pat. No. 5,065,468, issued Nov. 19, 1991, describes a dock plate having handles and wheels for facilitating manual positioning of the plate. My U.S. Pat. No. 5,306,112, issued Apr. 26, 1994 describes a manual dock plate lifting apparatus having a hook which engages a slot in a dock plate. Other more elaborate devices, include power-driven leveling mechanisms and telescoping platforms permanently built into a loading dock.

The principal object of this invention is to provide a simple, inexpensive and ergonomically superior loading ramp system. Other important objects of the invention include improved safety, ease of installation and maintenance, reliability and ease of adjustability. It is also an important object of the invention to provide a loading ramp system that can be readily relocated.

In accordance with the invention, rollers are mounted on a ramp adjacent to its opposite side edges. Means are provided for moving the ramp horizontally so that is front edge enters a cargo compartment of a vehicle. Rails supportable on a loading dock, have upwardly sloping surfaces engageable by the rollers, and serve to lift the front edge of the ramp as the ramp is moved toward the vehicle. The rails also having downwardly sloping surfaces allowing the front edge of the ramp to engage the floor of the cargo compartment as the ramp is moved toward the vehicle. The front edge of the rail reaches its maximum height at a location in which the ramp extends beyond the loading dock.

In one preferred embodiment of the invention, the rails, and their upwardly sloping surfaces are secured to a frame which maintains the upwardly sloping surfaces of the rails in fixed relationship to each other. The frame facilitates relocation of the apparatus. The rails are also secured in fixed relation to a loading dock.

In a manually operated embodiment of the invention, the ramp has at least one projection, and at least one of the rails has a series of notches for receiving the projection, so that the ramp can be held in any selected one of a plurality of fixed horizontal positions by engagement of the projection with a selected one of the notches.

A safety gate for preventing inadvertent movement of loading dock personnel off the loading dock preferably comprises at least one post fixed to the frame, and a gate hinged to the post.

The manually operated version of the handling apparatus preferably comprises wheels adapted to roll upon the surface of a loading dock, a hook adapted to engage and lift the ramp at a location such that the rear edge of the ramp rises as the ramp rotates on the rollers, and a handle connected to the hook, and positioned so that manual downward movement of the handle causes the ramp handling apparatus to pivot on the axle of the wheels so that the hook lifts the ramp.

The handle is connected to the axle by a telescoping connection, comprising a first part extending away from the axle and a second part having the handle at one end and having its other end insertable into the first part. The second part is movable from an inserted position to an extended position, and the first and second parts include means for supporting the first and second parts in oblique relationship to each other when the second part is in its extended position. This oblique relationship makes it possible for a horizontal force exerted on the handle when the hook is engaged with the ramp, to result in a substantial horizontal force exerted by the hook on the ramp, so that the rollers of the ramp can be caused to move up the upwardly sloping surfaces of the rails.

In a powered version of the handling apparatus, the ramp is moved forward and retracted by linear actuating means, for example a pair of hydraulic cylinders located on opposite sides of the ramp and having their bodies attached to the rails and their pistons attached to the sides of the ramp. As the actuators push the ramp forward toward the interior of a vehicle parked at the loading dock, the wheels ride over convex plates situated on the rails, thereby causing the leading edge of the ramp to rise as it approaches the interior of the vehicle, and then drop into contact with the floor of the vehicle. The ramp is withdrawn from the vehicle by operating the actuators in reverse.

Further objects, details and advantages of the invention will become apparent from the following detailed description when read in conjunction with the drawings.

DESCRIPTION OF DRAWINGS

FIG. 3 is a perspective view of an alternative loading ramp having a powered ramp handling apparatus.

DETAILED DESCRIPTION

Figure 1:
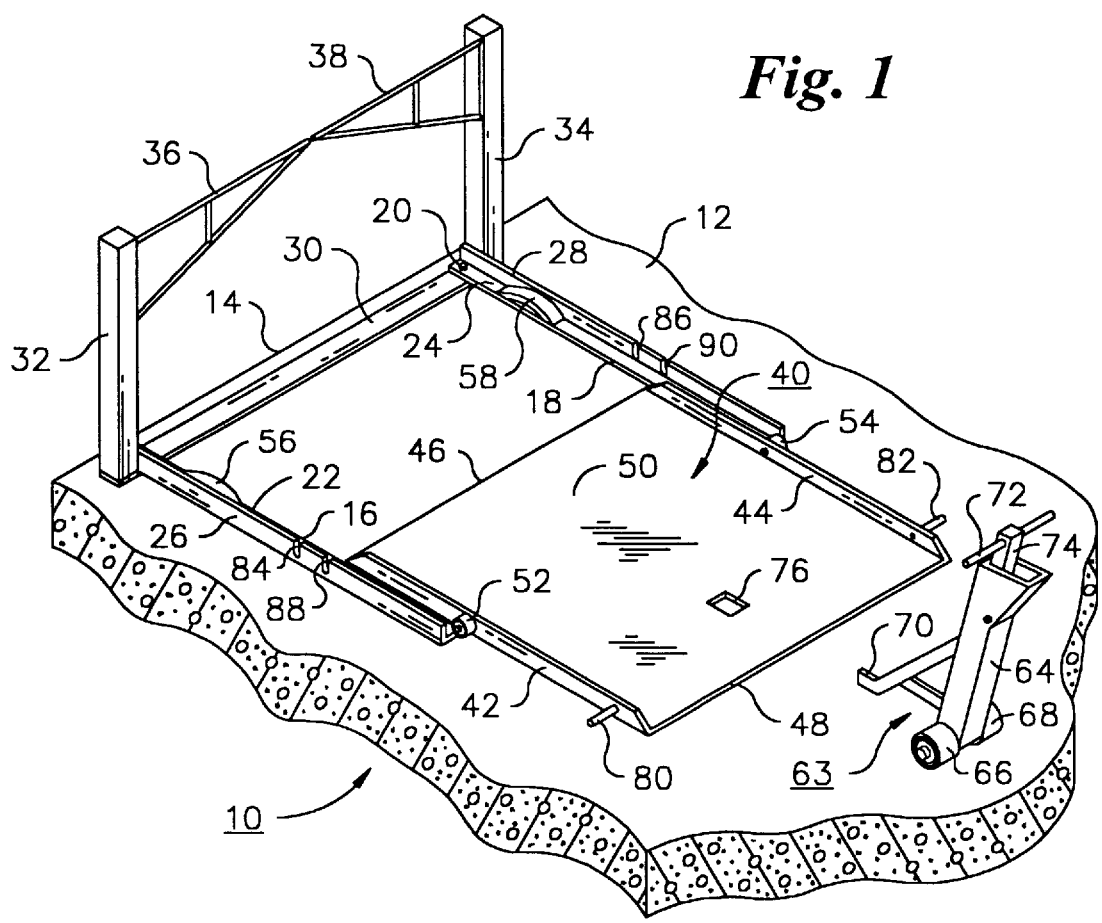
FIG. 1. is a perspective view of a combined loading ramp and manually operated handling apparatus in accordance with the invention, showing the apparatus situated on a loading dock.

FIG. 1 shows a concrete loading dock 10 having an upper surface 12 with an edge 14. A pair of parallel rails 16 and 18 are removably secured to the upper surface 12 by bolts 20. These rails preferably have L-shaped cross-sections, with horizontal flanges 22 and 24 lying on the loading dock surface 12, and vertical flanges 26 and 28 extending upwardly from the outer edges of the horizontal flanges. The two rails are secured in fixed relationship to each other by a frame comprising a plate 30, welded underneath flanges 22 and 24 at the ends of the rails nearest the edge 14 of the loading dock. Optionally other frame members may be provided to ensure a rigid connection between the rails.

The plate 30 extends outwardly beyond both rails and has upright posts 32 and 34 welded at its opposite ends. Safety gates 36 and 38 are hinged to the posts, and, while capable of swinging inwardly over the dock, are prevented from swinging outwardly by stops (not shown). The safety gates help prevent dock personnel from accidentally falling off the dock. The posts, safety gates and rails are secured together, and can be installed and transported as a unit. Auxiliary devices such as lights, cooling fans, etc. can be mounted on the posts.

A loading ramp, in the form of a dock board 40, having curbs 42 and 44 formed at its opposite side edges, fits between flanges 26 and 28 of the rails. The loading ramp has a front edge 46 adapted for engagement with the cargo floor of a truck or trailer, and a rear edge 48 for engaging the loading dock surface 12. The ramp preferably has an anti-skid upper surface 50. The upper surface of the ramp can be flat as shown, or it can be made convex so that, except for the front and rear edges, the ramp does not engage the dock or a vehicle's cargo floor. This convex configuration is desirable to prevent an intermediate portion of the underside of the ramp from engaging the edges of the dock or the vehicle's cargo floor when the dock and cargo floor are not at the same level.

The ramp is provided with rollers 52 and 54, which are rotatably mounted on bearings secured to the curbs of the ramp at locations such that the two rollers are rotatable on a common axis extending parallel to front edge 46 at a location closer to the front edge than to the rear edge 48. The rollers are positioned on the outside faces of the curbs 42 and 44 and spaced from each other so that they can roll on the horizontal flanges 22 and 24 of the rails.

Convex plates 56 and 58 are welded to the horizontal flanges of the rails near the front ends of the rails. These convex plates are engageable by the rollers 52 and 54, as the ramp is moved forward, causing the front edge 46 of the ramp to rise. Preferably, the rollers on the ramp and the convex plates 56 and 58 are located so that the front edge of the plate begins to rise as it passes, in the forward direction, over the edge 14 of the dock. The front edge of the plate reaches its maximum height when the rollers reach the peaks of the convex plates 56 and 58, and the front edge of the plate is approximately 6 to 18 inches forward of the edge 14 of the dock. This enables the front edge of the plate to clear the rear edge 60 of the cargo floor 62 of a vehicle, as shown in FIG. 2, even when the cargo floor 62 is several inches above the level of the dock surface 12.

As the ramp continues to move in the forward direction, its rollers travel past the peaks of the convex plates 56 and 58 and over their downwardly sloping surfaces. The front edge 46 of the ramp 40 then drops onto the floor 62 of the vehicle.

The ramp is maneuvered by a manually operated handling device 63 (FIG. 1), which comprises a body 64 having a pair of wheels 66 and 68, a hook 70, and a handle 72 on a telescoping section 74, which is partially stored inside the body 64 in FIG. 1. The hook is receivable in a slot 76 centered between the side edges of the ramp 40 and located adjacent to the rear edge 48. In the case of a flat ramp, as shown, the slot 76 is provided with a clearance underneath the ramp to allow it to receive the hook even though the underside of the ramp rests on the dock surface 12. In the case of a ramp having a convex upper surface, this clearance will not ordinarily be necessary.

Figure 2:
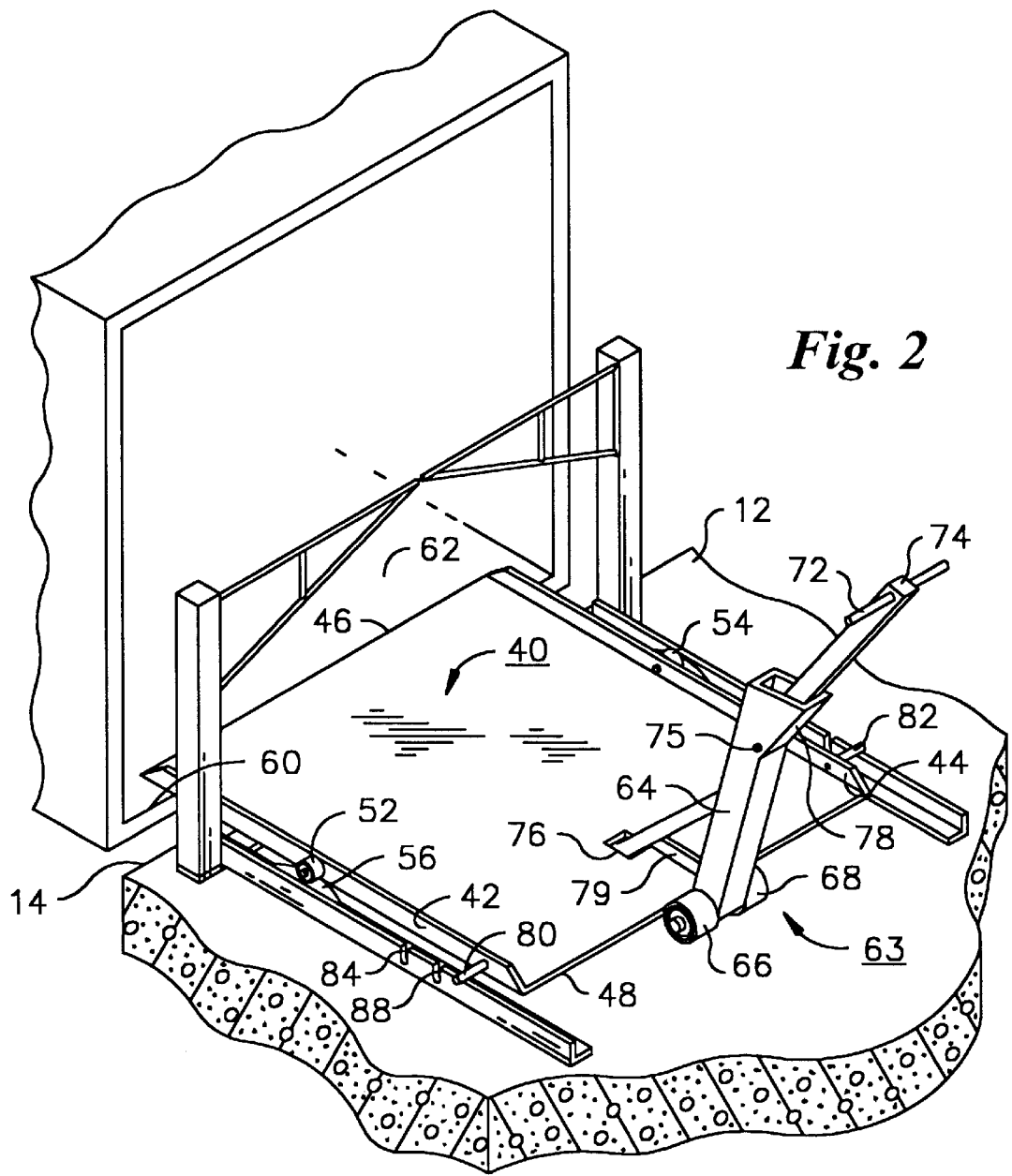
FIG. 2 is a perspective view of the apparatus of FIG. 1, showing the ramp being moved toward the cargo compartment of a vehicle.

As shown in FIG. 2, the telescoping section 74 is extended and rests against the back wall 78 of a flared section at the upper end of the body 64 of the handling device so that the telescoping section 74 and the body 64 are in an oblique relationship. The telescoping section and body may be secured in this position by a suitable locking device, e.g. pin 75. The oblique relationship between the body and the telescoping section of the handling device allows the handle to be positioned farther from the axle of the wheels 66 and 68 and provides leverage allowing the operator to lift the rear of the ramp by inserting the hook 70 into slot 76, as shown in FIG. 2, pushing down on the handle 72. The upper surface of the ramp comes into contact with a reinforcing bar 79, which connects the arm of hook 70 with the body 65 of the handling device. The oblique relationship between the body and the telescoping section of the handling device also enables the operator more easily to exert a horizontal force on the handle to cause the ramp to move forward over the rails and to cause the rollers 52 and 54 to pass over the convex plates 56 and 58.

Pins 80 and 82, which extend laterally outwardly from the curbs 42 and 44 adjacent to the rear edges 48 of the ramp, pass over the upper edges of the vertical rail flanges 26 and 28 as the ramp is pushed forward, and can be engaged either in notches 84 and 86, or in notches 88 and 90 provide in the flanges 26 and 28. The engagement of the pins with the selected notches, holds the ramp in position against forward and rearward movement when it is in use, thereby preventing the ramp from accidentally falling off the edge of the vehicle or off the edge of the loading dock.

In the movement of the ramp into the rear of the vehicle, as its rollers 52 and 54 move past the peaks of the convex plates 56 and 58, and the front edge of the ramp engages the cargo floor 62, the front edge of the ramp slides forward on the cargo floor, and the rollers 52 and 54 disengage the convex plates. This allows the operator to lower the rear edge 48 of the ramp into engagement with the dock surface 12, and cause the pins 80 and 82 to enter the slots. The handling apparatus can then be disengaged from the ramp while the vehicle is loaded or unloaded.

To withdraw the ramp from the vehicle, the hook of the handling apparatus is reengaged with the slot in the ramp and the handle is pushed down to lift the pins out of the slots in which they are engaged. The handling apparatus is then pulled rearward, causing the rollers to pass over the convex plates, whereupon the ramp can be pulled back and stored between the rails.

By virtue of the cooperation of the rollers on the sides of the ramp with the convex plates on the rails, the apparatus enables a single loading dock worker to maneuver a heavy ramp easily and safely into position with its front edge on the cargo floor of a vehicle. The position of the ramp can be easily adjusted by placing the laterally extending pins of the ramp in the appropriate slots in the rails. The loading ramp system can easily be disconnected from the loading dock and relocated. Installation and relocation are facilitated by the fact that the rails are connected together by a frame and by the fact that the safety gate posts are also fixed to the rails and frame.

In the powered version of the ramp handling apparatus depicted in FIG. 3, a ramp 92, has rollers 94 and 96 secured to its side curbs 98 and 100 respectively. These rollers are located approximately midway between the leading edge 102 and the trailing edge 104 of the ramp, but slightly forward of the center of gravity of the ramp. The ramp is situated between a pair of rails 106 and 108, which are preferably fixed to the floor 110 of the loading dock. The rails can be fixed to each other by one or more plates (not shown in FIG. 3) corresponding to plate 30 of FIG. 1.

The rails are in the form of angles, and serve as supports for posts 112 and 114, which support hinged safety gates 116 and 118 respectively. This embodiment of the invention preferably also has protective barriers above the sides of the rails, the barriers comprising horizontal bars 120 and 122 extending between post 112 and a rear post 124 fixed to the rail 106, and a similar pair of horizontal bars extending between post 114 and a rear post 130 fixed to rail 108. These protective barriers, which extend alongside both sides of the ramp, inhibit personnel from approaching the ramp except across its front and rear edges 102 and 104.

The rails have convex plates 132 and 134 respectively, opposite to each other, and located in relation to the rollers of the ramp so that, the wheels ride up onto the convex plates and reach the peaks of the plates, as shown in FIG. 3, when the leading edge 102 of the ramp is located approximately at the edge of the loading dock, and preferably a short distance beyond the edge of the loading dock.

A pair of linear actuators, preferably hydraulic piston and cylinder units, are located on opposite sides of the ramp adjacent to the trailing edge 104. One such unit comprises a cylinder 136, which is pivoted to a pin 138 on rail 108, and an internal piston (not shown) the externally extending rod 140 of which has a crosshead 142 receiving a wrist pin extending laterally from the side curb 100 of the ramp. A similar piston and cylinder unit 144 is provided on the opposite side of the ramp, the crosshead 146 of the piston rod being connected to a wrist pin 148.

The piston and cylinder units are preferably two-way actuators connected to a hydraulic pump and valving (not shown) in such a way that the ramp can be readily moved forward and rearward by operation o the cylinder units. As the ramp moves forward, the movement of the rollers 94 and 96 over the convex plates 132 and 134 causes its leading edge 102 to rise, thereby ensuring that the ramp clears the back edge of the floor of a vehicle backed up the loading dock. As the forward movement of the ramp continues, the leading edge drops onto the floor of the vehicle. Reverse operation of the actuators withdraws the ramp.

The ramp can be moved by electrical linear actuators, for example actuators of the screw type or rack and pinion type, by pneumatic actuators, and by alternative devices, including power-operated cables associated with the rails and permanently connected to the ramp.

Numerous other modifications can be made to the apparatus described. For example the convex ramps on the rails can be made in various shapes and can have a much more gradual slope, especially on the sides facing toward the rear edge of the ramp. The ramp can be fabricated from a variety of materials, including steel, aluminum, various alloys, reinforced synthetic resins and combinations of such materials. The heights and positions of the rollers on relative the ramp can be made adjustable. The dual safety gates can be replace by a single gate extending from one post to the other. These and other modifications can be made without departing from the scope of the invention as defined in the following claims.

I claim:

1. A combined loading ramp and handling apparatus comprising:

a ramp having an upper surface for supporting cargo being transferred between a trailer and a loading dock, a front edge for engagement with the floor of a trailer, a rear edge for engagement with a loading dock, and a pair of opposite side edges;

a pair of rollers mounted respectively on the ramp adjacent to said opposite side edges of the ramp;

means for moving the ramp horizontally so that its front edge enters a cargo compartment of a vehicle; and rail means, supportable on a loading dock and having upwardly sloping surfaces engageable by said rollers, for lifting the front edge of the ramp as the ramp is moved toward the vehicle;

the rail means also having downwardly sloping surfaces allowing the front edge of the ramp to engage a floor of the cargo compartment as the ramp is moved toward the vehicle.

2. A combined loading ramp and handling apparatus according to claim 1 in which the rollers are located on the ramp and the upwardly sloping surfaces are located on the rail means in positions such that the front edge of the rail reaches its maximum height at a location in which the ramp extends beyond the loading dock.

3. A combined loading ramp and handling apparatus according to claim 1 including frame means, connected to said rail means, for maintaining the upwardly sloping surfaces of the rail means in fixed relationship to each other.

4. A combined loading ramp and handling apparatus according to claim 1 including means for securing the rail means in fixed relation to a loading dock.

5. A combined loading ramp and handling apparatus according to claim 1 in which the ramp has at least one projection, and the rail means also includes means, comprising a series of notches, for receiving the projection, whereby the ramp can be held in any selected one of a plurality of fixed horizontal positions by engagement of the projection with a selected one of the notches.

6. A combined loading ramp and handling apparatus according to claim 1 including frame means, connected to said rail means, for maintaining the upwardly sloping surfaces of the rail means in fixed relationship to each other; means for securing the rail means in fixed relation to a loading dock; and safety gate means for preventing inadvertent movement of loading dock personnel off the loading dock, the safety gate means comprising at least one post fixed to said frame means, and a gate hinged to said post.

7. A combined loading ramp and handling apparatus according to claim 1 in which said means for moving the ramp horizontally comprises wheel means adapted to roll upon the surface of a loading dock, the wheel means being having an axle; a hook adapted to engage and lift the ramp at a location such that lifting of the ramp at said location causes the rear edge of the ramp to rise as the ramp rotates on the rollers; and handle means connected to the hook, and positioned so that manual downward movement of the handle causes the ramp moving means to pivot on said axle so that the hook lifts the ramp at said location.

8. A combined loading ramp and handling apparatus according to claim 7 in which the handle is connected to the axle by telescoping connecting means, comprising a first part extending away from the axle and a second part having said handle at one end and having its other end insertable into the first part; in which the second part is movable from an inserted position to an extended position; and in which the first and second parts include means for supporting the first and second parts in oblique relationship to each other when the second part is in said extended position, whereby a horizontal force exerted on the handle when the hook is engaged with the ramp, results in a substantial horizontal force exerted by the hook on the ramp.

9. A combined loading ramp and handling apparatus according to claim 1 in which the means for moving the ramp horizontally comprises at least one power-operated linear actuator.

10. A combined loading ramp and handling apparatus according to claim 1 in which the means for moving the ramp horizontally comprises at least one fluid-powered piston and cylinder unit.

11. A combined loading ramp and handling apparatus according to claim 1 in which the means for moving the ramp horizontally comprises a power-operated linear actuator comprising first and second relatively movable elements, the first element being connected to the ramp and the second element being connected to the rail means.

12. A combined loading ramp and handling apparatus according to claim 11 including means for securing the rail means in fixed relation to a loading dock.

13. A combined loading ramp and handling apparatus according to claim 1 in which the means for moving the ramp horizontally comprises a pair of power-operated linear actuators located adjacent to the side edges of the ramp, each linear actuator comprising first and second relatively movable elements, the first element of each actuator being connected to the ramp and the second element of each actuator being connected to the rail means.

14. A combined loading ramp and handling apparatus according to claim 13 including means for securing the rail means in fixed relation to a loading dock.

15. A combined loading ramp and handling apparatus according to claim 1 in which the means for moving the ramp horizontally comprises at least one power-operated linear actuator, and having protective barrier means, secured to the rail means and extending alongside both sides of the ramp, for inhibiting personnel from approaching the ramp except across its front and rear edges.

* * * * *